United States Patent
Keeling et al.

(10) Patent No.: US 9,142,990 B2
(45) Date of Patent: Sep. 22, 2015

(54) METHOD OF MULTI-COIL OPERATION AND OPTIMIZATION

(71) Applicant: QUALCOMM Incorporated, San Diego, CA (US)

(72) Inventors: Nicholas A. Keeling, Auckland (NZ); Jonathan Beaver, Auckland (NZ); Chang-Yu Huang, Auckland (NZ)

(73) Assignee: Qualcomm Incorporated, San Diego, CA (US)

( * ) Notice: Subject to any disclaimer, the term of this patent is extended or adjusted under 35 U.S.C. 154(b) by 231 days.

(21) Appl. No.: 13/745,676

(22) Filed: Jan. 18, 2013

(65) Prior Publication Data

US 2014/0203769 A1    Jul. 24, 2014

(51) Int. Cl.
*H02J 7/00* (2006.01)
*H02J 7/02* (2006.01)
*B60L 11/18* (2006.01)

(52) U.S. Cl.
CPC .............. *H02J 7/007* (2013.01); *B60L 11/1831* (2013.01); *H02J 7/025* (2013.01); *Y02T 90/168* (2013.01); *Y04S 30/12* (2013.01)

(58) Field of Classification Search
CPC ........................................................ H02J 5/005
USPC .................... 320/107–109, 127–139, 141
See application file for complete search history.

(56) References Cited

U.S. PATENT DOCUMENTS

| | | | |
|---|---|---|---|
| 5,012,236 | A | 4/1991 | Troyk et al. |
| 7,969,269 | B2 | 6/2011 | Boys et al. |
| 2010/0213770 | A1 | 8/2010 | Kikuchi |
| 2011/0115429 | A1 | 5/2011 | Toivola et al. |
| 2012/0161696 | A1 | 6/2012 | Cook et al. |
| 2012/0262002 | A1 | 10/2012 | Widmer et al. |

(Continued)

FOREIGN PATENT DOCUMENTS

| | | |
|---|---|---|
| WO | WO-2007100265 A1 | 9/2007 |
| WO | 2010090538 A1 | 8/2010 |

(Continued)

OTHER PUBLICATIONS

Budhia M, et al., Development and evaluation of single sided flux couplers for contactless electric vehicle charging, Energy Conversion Congress and Exposition (ECCE). 2011 IEEE. IEEE. Sep. 17, 2011, pp. 614-621, XP032067220.

(Continued)

*Primary Examiner* — Paul Dinh
(74) *Attorney, Agent, or Firm* — Knobbe, Martens, Olson & Bear, LLP

(57) ABSTRACT

This disclosure provides systems, methods and apparatus for wireless power transfer and particularly wireless power transfer to remote systems such as electric vehicles. In one aspect, a system comprises substantially co-planar first and second receiver coils. The system further comprises a third receiver coil. The system further comprises a controller configured to determine a current of the co-planar first and second receiver coils, a current of the third receiver coil, and a duty cycle of the wireless power transfer receiver device. The controller is configured to enable the co-planar first and second receiver coils, the third receiver coil, or the co-planar first and second receiver coils and the third receiver coil based on a comparison of the current of the co-planar first and second receiver coils, the current of the third receiver coil, and the duty cycle.

41 Claims, 10 Drawing Sheets

(56) References Cited

U.S. PATENT DOCUMENTS

2013/0249479 A1* 9/2013 Partovi .................. 320/108
2014/0049212 A1* 2/2014 Sawa et al. .............. 320/108

FOREIGN PATENT DOCUMENTS

| WO | 2010090539 A1 | 8/2010 |
| WO | 2012018268 A1 | 2/2012 |
| WO | WO-2012018269 A1 | 2/2012 |

OTHER PUBLICATIONS

Covic G.A., et al., "A bipolar primary pad topology for EV stationary charging and highway power by inductive coupling", Energy Conversion Congress and Exposition (ECCE), 2011 IEEE, IEEE, Sep. 17, 2011, pp. 1832-1838, XP032067402.

International Search Report and Written Opinion—PCT/US2014/011492—ISA/EPO—Feb. 17, 2015.

* cited by examiner

US 9,142,990 B2

METHOD OF MULTI-COIL OPERATION AND OPTIMIZATION

FIELD

The present invention relates generally to wireless power transfer, and more specifically to devices, systems, and methods related to wireless power transfer to remote systems such as vehicles including batteries. More particularly, the present invention relates to controlling induction coils in a wireless power transfer system.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transfer receiver device for controlling a current supplied to a battery. The device comprises a first receiver coil. The device further comprises a second receiver coil. The first and second receiver coils may be substantially co-planar. The device further comprises a third receiver coil. The co-planar first and second receiver coils may be collectively positioned substantially central to the third receiver coil. The first, second, and third receiver coils may be configured to electrically connect to a load. The device further comprises a controller configured to determine a current of the co-planar first and second receiver coils, a current of the third receiver coil, and a duty cycle of the wireless power transfer receiver device. The controller may be configured to enable the co-planar first and second receiver coils, the third receiver coil, or the co-planar first and second receiver coils and the third receiver coil based on a comparison of the current of the co-planar first and second receiver coils, the current of the third receiver coil, and the duty cycle.

Another aspect of the disclosure provides a method for controlling a current supplied to a battery. The method comprises determining a current of co-planar first and second receiver coils, a current of a third receiver coil, and a duty cycle of a wireless power transfer receiver device. The co-planar first and second receiver coils may be collectively positioned substantially central to the third receiver coil. The method further comprises enabling the co-planar first and second receiver coils, the third receiver coil, or the co-planar first and second receiver coils and the third receiver coil based on a comparison of the current of the co-planar first and second receiver coils, the current of the third receiver coil, and the duty cycle.

Another aspect of the disclosure provides an apparatus for controlling a current supplied to a battery. The apparatus comprises means for determining a current of co-planar first and second receiver coils, a current of a third receiver coil, and a duty cycle of a wireless power transfer receiver device. The co-planar first and second receiver coils may be collectively positioned substantially central to the third receiver coil. The apparatus further comprises means for enabling the co-planar first and second receiver coils, the third receiver coil, or the co-planar first and second receiver coils and the third receiver coil based on a comparison of the current of the co-planar first and second receiver coils, the current of the third receiver coil, and the duty cycle.

Another aspect of the disclosure provides a non-transitory computer-readable medium comprising code that, when executed, causes an apparatus to determine a current of co-planar first and second receiver coils, a current of a third receiver coil, and a duty cycle of a wireless power transfer receiver device. The co-planar first and second receiver coils may be collectively positioned substantially central to the third receiver coil. The medium further comprises code that, when executed, causes an apparatus to enable the co-planar first and second receiver coils, the third receiver coil, or the co-planar first and second receiver coils and the third receiver coil based on a comparison of the current of the co-planar first and second receiver coils, the current of the third receiver coil, and the duty cycle.

Figure 1:
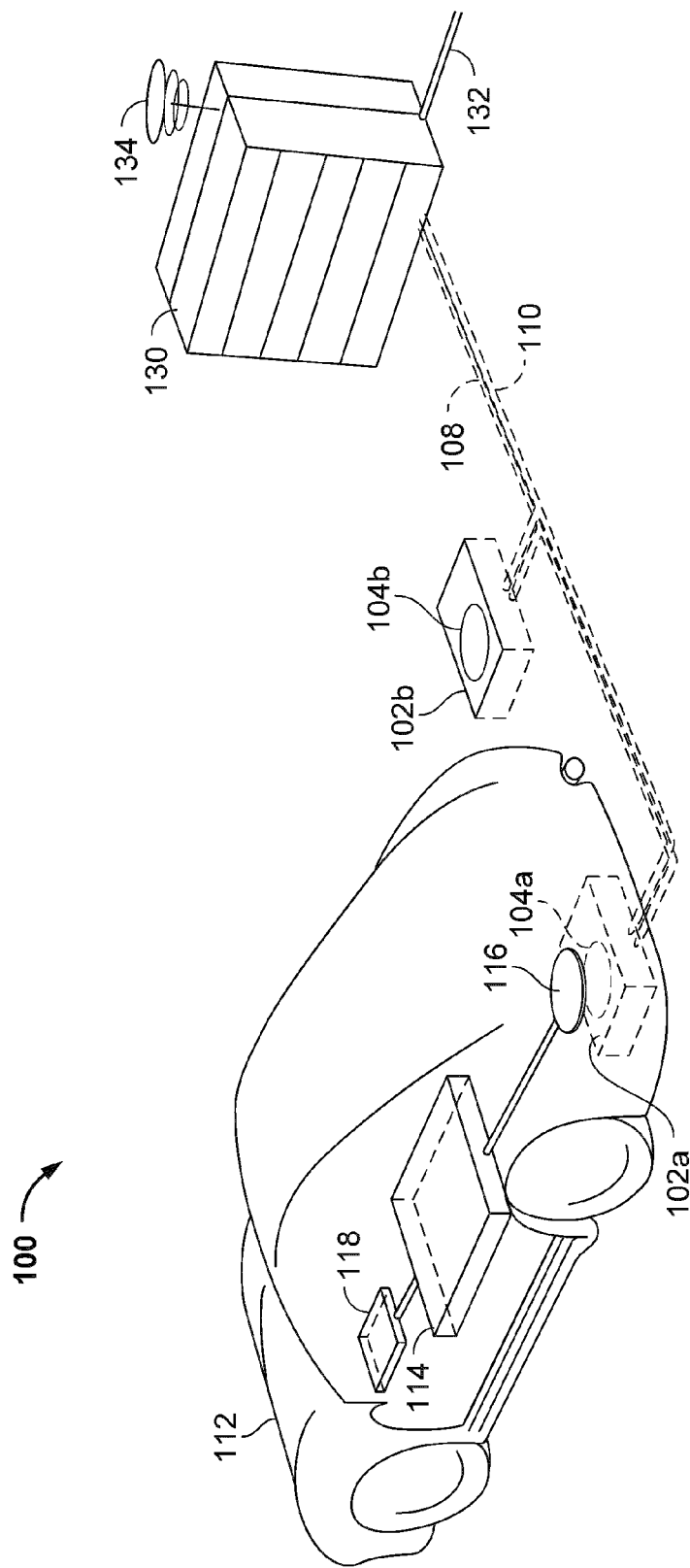
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer. It will be understood that, throughout this specification, two components being "coupled" may refer to their interaction through direct or indirect ways, and may further refer to a physically connected (e.g. wired) coupling or a physically disconnected (e.g. wireless) coupling.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Inductive power transfer (IPT) systems are one way for the wireless transfer of energy. In IPT, a primary (or "transmitter") power device transmits power to a secondary (or "receiver") power receiver device. Each of the transmitter and receiver power devices include inductors, typically an arrangement of coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

In electric vehicle and plug-in hybrid vehicle IPT systems the primary power device may be situated on the ground and may be known as a "base" device or power pad. The secondary power device may be situated on the electric vehicle and may be known as a "pick-up" device or power pad. These devices are commonly used to transmit power from the base (transmitter) device to the pick-up (receiver) device. Some IPT systems are also able to function in a mode in which power is transferred the other way, i.e. from the pick-up device to the base device. In this mode, the pick-up device is technically the primary device and the base device is the secondary device because the pick-up induces an EMF in the base. This may allow power stored in an electric vehicle battery to be transferred back to a mains electricity grid.

PCT publication no. WO 2010/090539 discloses an IPT system for powering electric vehicles in which a base (usually the primary) coil arrangement, typically positioned on the ground, consists of two separate co-planar coils positioned above a core formed from a material of high magnetic permeability, such as ferrite. In this arrangement, there is no straight path through the core that passes through the coils. As such, the coils act as pole areas and lines of magnetic flux arc between them in the form of a "flux pipe" above the coils, a zone of high flux concentration. The arrangement is considered to result in little leakage of flux below the coils on the side of the core.

The same publication also discloses the use of three coils in the coil arrangement of the receiver (pick-up) device. The first two coils are separate co-planar coils as in the base coil arrangement. During charging, these two coils are aligned with the co-planar coils in the base device. The third coil is positioned centrally above the other two coils on the same side of the magnetically permeable core. The third coil allows power to be extracted from the vertical component of the magnetic field intercepted by the receiver device in addition to the horizontal component, which is extracted by the first two, co-planar coils. The co-planar coils are considered to have good tolerance to misalignment between the transmitter and receiver devices in the direction perpendicular to a line between the centers of the co-planar coils but less tolerance to misalignment in the direction parallel to the line between the centers of the co-planar coils. The three coil arrangement in the receiver device is considered to improve the tolerance of the IPT system in the parallel direction, thus increasing the overall tolerance of the system to misalignment in any direction.

PCT publication no. WO 2011/016737 describes an IPT system for powering electric vehicles in which a base coil arrangement includes two overlapping planar coils that are magnetically decoupled. Such a base coil may provide some benefits with regard to the efficiency of power transfer but also has many disadvantages, including the need for complex and costly componentry on the electric vehicle side of the system. It may be difficult to design the overlapping coils so that there is no mutual coupling between them and typically this is done in relation to other components in the system, thus making such a coil arrangement difficult and expensive to tailor to different types of IPT system.

Thus, there remains a need for improved tolerance to IPT system coil misalignment, both in the longitudinal (i.e. forwards/backwards relative to the vehicle) direction and the transverse (i.e. side-to-side) direction.

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In some embodiments, feedback may be generated by the wireless power transfer system 100, for example, electric vehicle 112 or a processor connected to a user interface of electric vehicle 112, or from a signal or sensor information that may be contained in the base wireless charging system 102a. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

It will be therefore understood that the terms "transmitter", "receiver", "primary" and "secondary" and the like are used herein to refer to the normal uses of the components of the wireless power transfer system when used for transferring power from the power supply to the electric vehicle, i.e. from the transmitter or primary device to the receiver or secondary device. However, the wireless power transfer system may involve the use of these components to transfer some power, which in some embodiments may only be a small amount, in the opposite direction, for example to transfer energy from the electric vehicle to the power distribution grid, as part of a process to improve alignment of the transmitter and receiver devices, or to identify which transmitter device is appropriately placed for transferring power to the receiver device. Therefore the "transmitter" may also be used to receive power and the "receiver" may also be used to transmit power. The use of these terms, although referring to the normal sense of operation of certain components of the system for ease of understanding, does not limit embodiments to any particular operation of such components.

Figure 2:
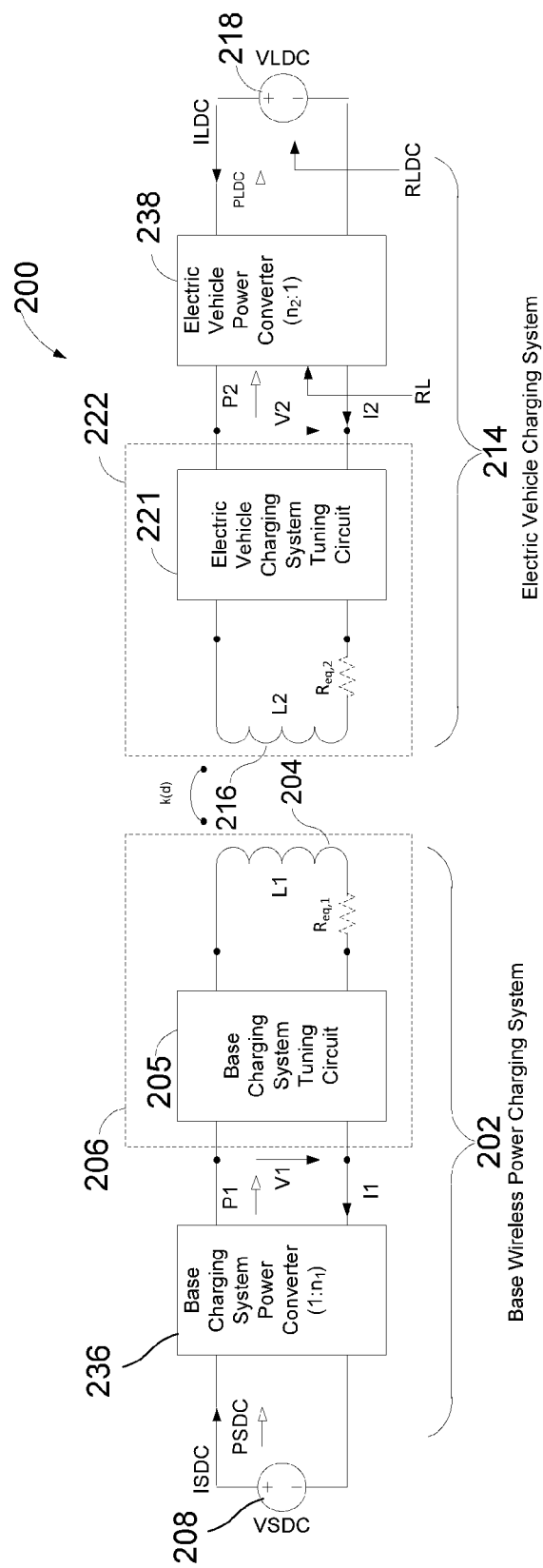
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, a capacitor may be added or may be integrated with the induction coil, and arranged to be in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil.

Coils adapted for use in resonant structures may be used for the electric vehicle induction coil 216 and the base system induction coil 204. Using resonant structures for coupling energy may be referred to "magnetic coupled resonance", "electromagnetic coupled resonance", and/or "resonant induction". The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The capacitor $C_1$ (not shown) may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

Both the base system transmit circuit 206, which includes the base system induction coil 204, and the electric vehicle receive circuit 222, which includes the electric vehicle induction coil 216, may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including an electric vehicle charging system tuning circuit 221 and electric vehicle induction coil 216. The electric vehicle charging system tuning circuit 221 may be provided to form a resonant circuit with the electric vehicle induction coil 216 that resonates at a desired frequency. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle induction coil 216 and electric vehicle charging system tuning circuit 221 receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LIC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to decouple the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same, energy is transferred highly efficiently. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

In this specification the term "coil" is used in the sense of a localized winding arrangement having a number of turns of electrically conducting material that all wind around a single central point. The term "coil arrangement" is used to mean any winding arrangement of conducting material, which may comprise a number of "coils".

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

As described above, according to some embodiments, coupling power between two induction coils that are in the near field of one another is disclosed. As described above, the near field may correspond to a region around the induction coil in which electromagnetic fields exist. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3A:
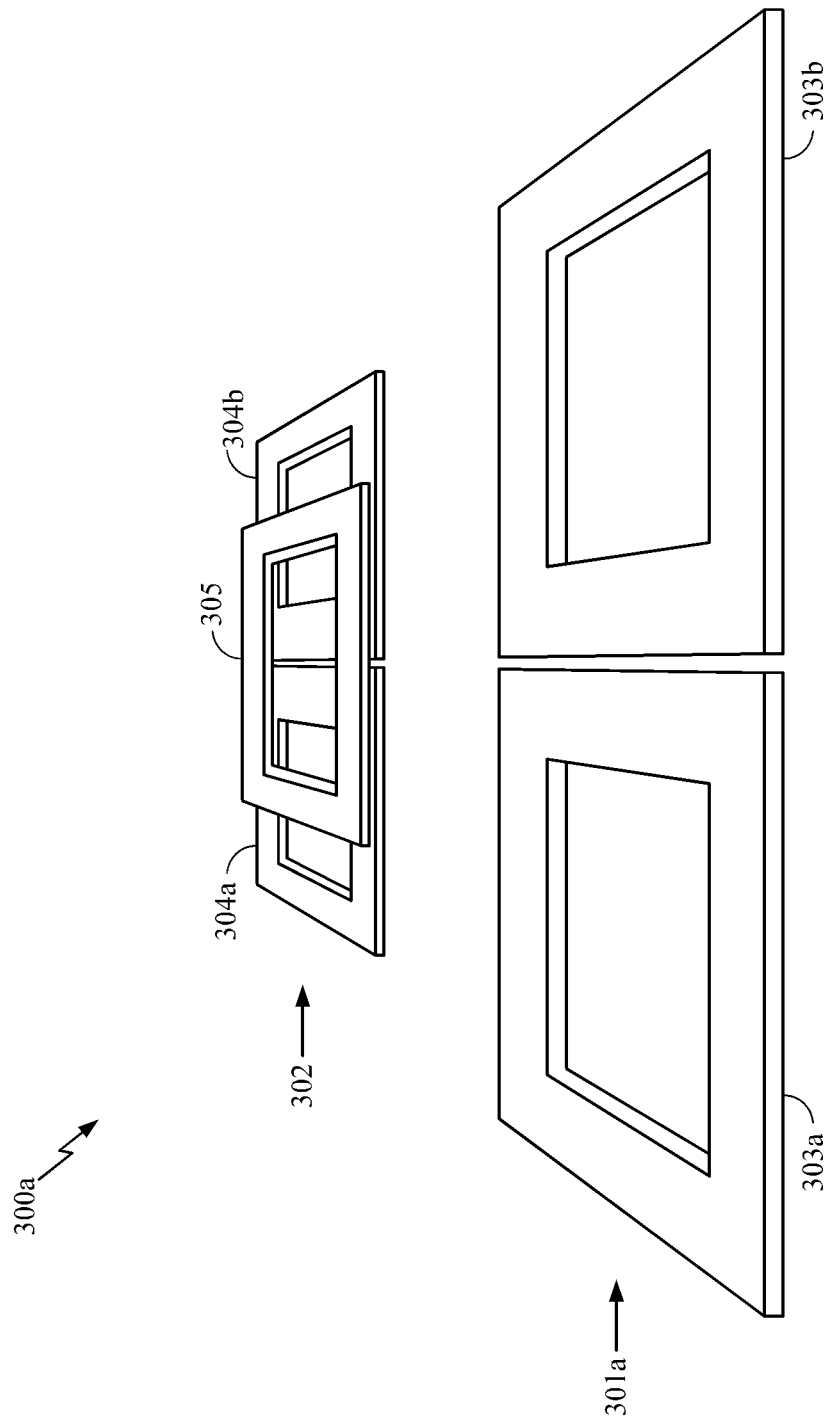
FIG. 3A is a perspective view illustration of induction coil arrangements used in an electric vehicle wireless power transfer system.

FIG. 3A is a perspective view illustration of induction coil arrangements 300a used in an electric vehicle wireless power transfer system. The wireless power transfer system comprises base or transmitter wireless power transfer device which includes transmitter coil arrangement 301a and a pick-up or receiver wireless power transfer device which includes receiver coil arrangement 302. Only the coil arrangements 300a of the system are shown in FIG. 3A for clarity purposes. The transmitter coil arrangement 301a may, for example, form part of a wireless power transfer transmitter device situated on the ground in a vehicle parking space while the receiver coil arrangement 302 may, for example, form part of a wireless power transfer receiver device located on the underside of an electric vehicle. For the purposes of this specification, it will be assumed that the coil arrangements in FIG. 3A and all diagrams of a similar nature are viewed in the longitudinal direction of the electric vehicle. FIG. 3A shows receiver coil arrangement 302 positioned over transmitter coil arrangement 301a, a position suitable for wireless power transfer between the two coil arrangements upon energizing the transmitter coil arrangement 301a.

In the arrangement of FIG. 3A, transmitter coil arrangement 301a comprises two substantially co-planar transmitter coils 303a and 303b connected to one or more power sources such that electric current flows in the same direction in the adjacent portions of the two coils and the current in these adjacent portions has substantially the same magnitude and phase. As described herein, the substantially co-planar transmitter coils 303a and 303b arranged as illustrated in FIG. 3A may be referred to as a double base configuration.

Receiver coil arrangement 302 comprises two substantially co-planar receiver coils 304a and 304b and a third coil 305 positioned over the co-planar receiver coils 304a and 304b. The coils in coil arrangement 302 are connected to a battery of the electric vehicle.

Both transmitter and receiver coil arrangements are associated with magnetically permeable members such as ferrite cores (not shown) positioned under the transmitter coils and above the receiver coils. To transfer power in the known arrangement of FIG. 3A, an alternating electric current is passed through coil arrangement 301a. This creates a magnetic field in the form of a "flux pipe," a zone of high flux concentration, looping above coil arrangement 301a between the holes in transmitter coils 303a and 303b. In use, receiver coil arrangement 302 is positioned such that the receiver coils 304 and 305 intersect the lines of magnetic flux, thus inducing electric current in the receiver coils, which is supplied to the battery of the electric vehicle.

The co-planar receiver coils 304a and 304b extract power from the horizontal components of magnetic flux generated by the transmitter coils. The single receiver coil 305 extracts power from the vertical component of the magnetic flux generated by the transmitter coils. Thus, in combination, the coils of receiver coil arrangement 302 enable energy transfer between the transmitter and receiver devices of the wireless power transfer system to a reasonably efficient degree.

Figure 3B:
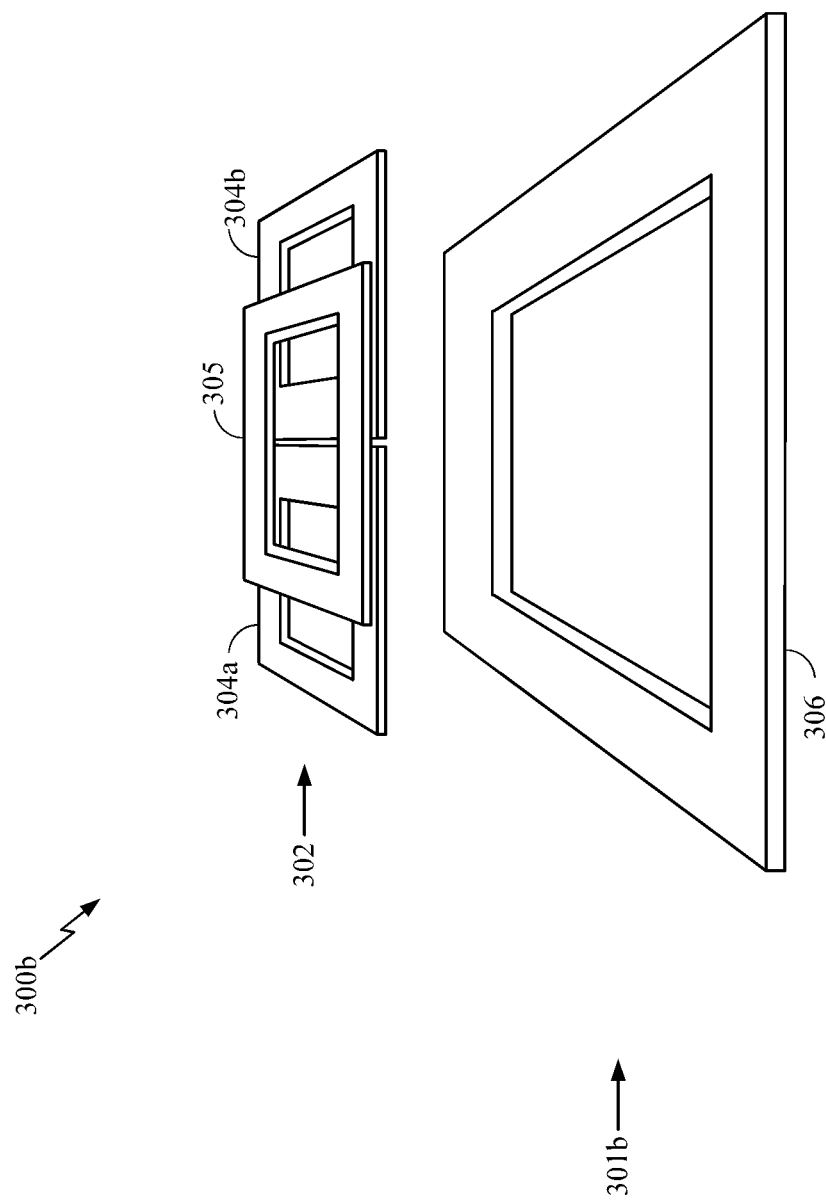
FIG. 3B is another perspective view illustration of induction coil arrangements used in an electric vehicle wireless power transfer system.

FIG. 3B is a perspective view illustration of induction coil arrangements 300b used in an electric vehicle wireless power transfer system. Like coil arrangements 300a, the wireless power transfer system comprises base or transmitter wireless power transfer device which includes transmitter coil arrangement 301b and a pick-up or receiver wireless power transfer device which includes the receiver coil arrangement 302 described above with respect to FIG. 3A. Only the coil arrangements 300b of the system are shown in FIG. 3B for clarity purposes. The transmitter coil arrangement 301b may, for example, form part of a wireless power transfer transmitter device situated on the ground in a vehicle parking space while the receiver coil arrangement 302 may, for example, form part of a wireless power transfer receiver device located on the underside of an electric vehicle. FIG. 3B shows receiver coil arrangement 302 positioned over transmitter coil arrangement 301b, a position suitable for wireless power transfer between the two coil arrangements upon energizing the transmitter coil arrangement 301b.

In the arrangement of FIG. 3B, transmitter coil arrangement 301b comprises a single transmitter coil 306 connected to one or more power sources such that electric current flows in the transmitter coil 306. The electric current may flow in a clockwise or counterclockwise direction. In some embodiments, the depth of transmitter coil 306 is twice as long as the depth of the substantially co-planar transmitter coils 303a and 303b of FIG. 3A. As described herein, the single transmitter coil 306 arranged as illustrated in FIG. 3B may be referred to as a rectangular base configuration.

In some embodiments, an alignment of the receiver coils of the electric vehicle 112 with the transmitter coils of the base wireless power charging system 202 determines an amount of electric current induced in the receiver coils. For example, as the electric vehicle 112 moves horizontally and/or vertically across the base wireless power charging system 202, the current induced in each of the receiver coils may vary.

In further embodiments, the transmitter coil arrangement also affects an amount of electric current induced in the receiver coils. For example, if the transmitter coils are arranged in a double base configuration and the transmitter coils are perfectly aligned with the receiver coils, the current induced in the substantially co-planar receiver coils (e.g., receiver coils 304a and 304b) may be near a maximum value for the amount of current generated in the transmitter coils, whereas the current induced in the third receiver coil (e.g., receiver coil 305) may be near zero. Likewise, if the transmitter coil is arranged in a rectangular base configuration and the transmitter coil is perfectly aligned with the receiver coils, the current induced in the co-planar receiver coils may be near zero, whereas the current induced in the third receiver coil may be near a maximum value for the amount of current generated in the transmitter coil.

Figure 4A:
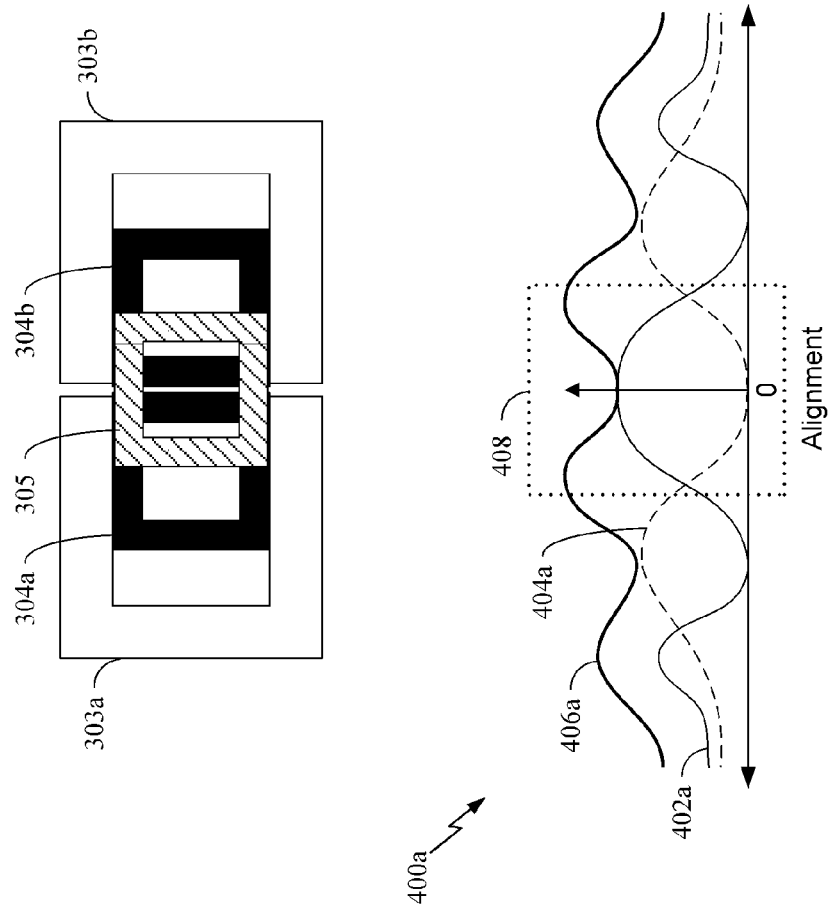
FIG. 4A is a diagram illustrating current generated by receiver induction coils as a function of an alignment of the receiver induction coils with transmitter induction coils arranged in a double base configuration.

FIG. 4A illustrates current generated by the substantially co-planar receiver coils 304a and 304b and the third receiver coil 305 as a function of an alignment of the receiver coils with the two substantially co-planar transmitter coils 303a and 303b arranged in the double base configuration. FIG. 4A illustrates a top-down view of the substantially co-planar transmitter coils 303a and 303b being perfectly aligned with the substantially co-planar receiver coils 304a and 304b and the third receiver coil 305. Graph 400a illustrates the current induced in the co-planar receiver coils 304a and 304b and the third receiver coil 305 as a function of the alignment of the receiver coils 304a, 304b, and 305 with the transmitter coils 303a and 303b.

For example, current 402a represents the current induced in the co-planar receiver coils 304a and 304b and current 404a represents the current induced in the third receiver coil 305. Current 406a represents the sum of currents 402a and 404a. As described above, when the receiver coils 304a, 304b, and 305 are perfectly aligned with the transmitter coils 303a and 303b (e.g., the alignment is "0"), the current 402a is near a maximum value for the amount of current generated in the transmitter coils 303a and 303b and the current 404a is near zero.

Box 408 represents an example area of operation for the transmitter coils 303a and 303b. For example, if the alignment is within the area covered by box 408, current may flow within the transmitter coils 303a and 303b for the purpose of transferring energy to the receiver coils 304a, 304b, and 305. The flow of current may be controlled by a controller, as described below with respect to FIG. 5. As illustrated in graph 400a, as the alignment moves to the outer edges of box 408, the currents 402a and 404a begin to converge while the current 406a begins to increase.

Figure 4B:
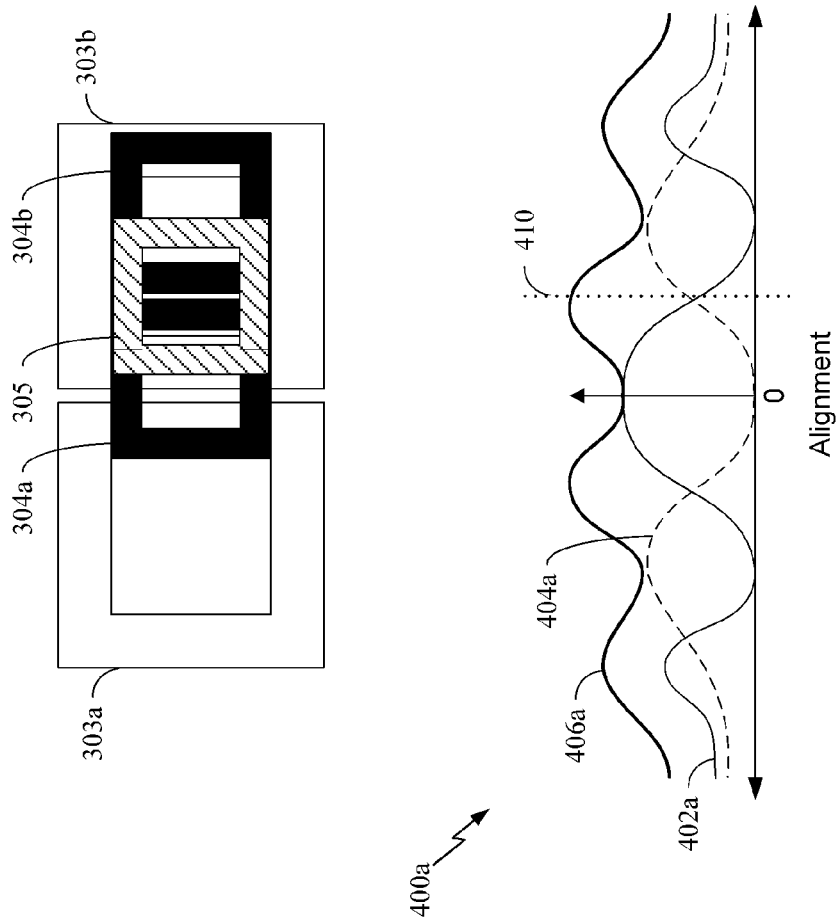
FIG. 4B is a diagram illustrating current generated by receiver induction coils when the receiver induction coils are not perfectly aligned with transmitter induction coils arranged in a double base configuration.

As an example, FIG. 4B illustrates the current generated by the substantially co-planar receiver coils 304a and 304b and the third receiver coil 305 when the receiver coils are not perfectly aligned with the substantially co-planar transmitter coils 303a and 303b arranged in the double base configuration. As illustrated in FIG. 4B, receiver coils 304a, 304b, and 305 are located to the right of a perfectly aligned position. Graph 400a illustrates the approximate current 402a, 404a, and 406a values at this alignment position, which is represented by line 410. In some embodiments, while current 402a at line 410 has a value that is lower than a value at the perfectly aligned position (e.g., at alignment "0"), currents 404a and 406a have a higher value than a value at the perfectly aligned position.

In some embodiments, line 410 may represent an alignment that falls within box 408. Thus, current may flow in the transmitter coils 303a and 303b for the purpose of transferring energy to the receiver coils 304a, 304b, and 305. In other embodiments, line 410 may represent an alignment that falls outside box 408. Thus, current may not flow in the transmitter coils 303a and 303b.

Figure 4C:
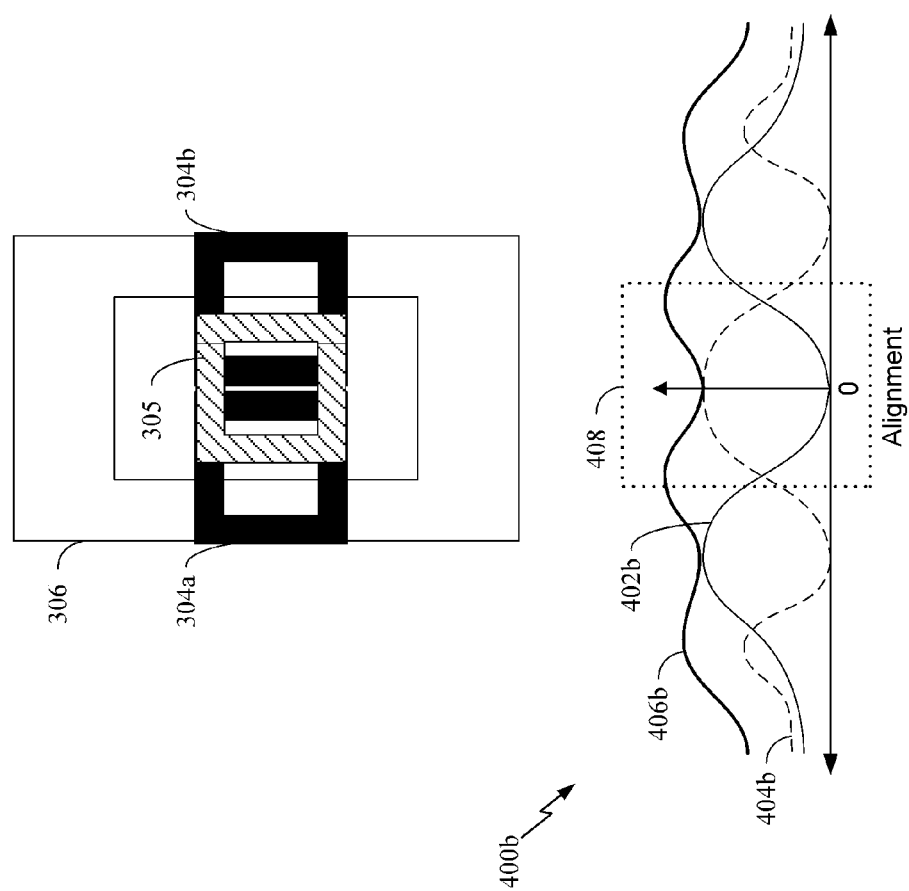
FIG. 4C is a diagram illustrating current generated by receiver induction coils as a function of an alignment of the receiver induction coils with a transmitter induction coil arranged in a rectangular base configuration.

FIG. 4C illustrates current generated by the substantially co-planar receiver coils 304a and 304b and the third receiver coil 305 as a function of an alignment of the receiver coils with the single transmitter coil 306 arranged in the rectangular base configuration. FIG. 4C illustrates a top-down view of the single transmitter coil 306 being perfectly aligned with the substantially co-planar receiver coils 304a and 304b and the third receiver coil 305. Graph 400b illustrates the current induced in the co-planar receiver coils 304a and 304b and the third receiver coil 305 as a function of the alignment of the receiver coils 304a, 304b, and 305 with the single transmitter coil 306.

For example, like currents 402a and 404a, current 402b represents the current induced in the co-planar receiver coils 304a and 304b and current 404b represents the current induced in the third receiver coil 305. Current 406b represents the sum of currents 402b and 404b. As described above, when the receiver coils 304a, 304b, and 305 are perfectly aligned with the single transmitter coil 306 (e.g., the alignment is "0"), the current 402b is near zero and the current 404b is near a maximum value for the amount of current generated in the transmitter coil 306.

Box 408 represents an example area of operation for the single transmitter coil 306. For example, if the alignment is within the area covered by box 408, current may flow within the single transmitter coil 306 for the purpose of transferring energy to the receiver coils 304a, 304b, and 305. As illustrated in graph 400b, as the alignment moves to the outer edges of box 408, the currents 402b and 404b begin to converge while the current 406b begins to increase.

As illustrated in FIGS. 4A-C, an alignment of the receiver coils of the electric vehicle 112 and the transmitter coils of the base wireless power charging system 202 and/or the transmitter coil arrangement may affect the current induced in each of the receiver coils. Because an alignment of the receiver coils and the transmitter coils and/or the transmitter coil arrangement may affect the current induced in each of the receiver coils, the electric vehicle 112 may need to determine which receiver coils should be used to supply current to the battery. While all receiver coils could remain enabled and supply current to the battery, enabling all receiver coils may unnecessarily increase the power consumption of the electric vehicle. Furthermore, too much current could be supplied to the battery, which could permanently damage the battery. Likewise, not enough current may be provided to charge the battery if only the co-planar receiver coils or only the third receiver coil is enabled.

Accordingly, the electric vehicle 112 may include one or more controllers that control which receiver coils supply current to the battery and/or the amount of current supplied to the battery. The one or more controllers may allow the battery of the electric vehicle 112 to receive a sufficient amount of power for charging. The one or more controllers may also function to minimize negative effects on the battery resulting from variations in the base wireless power charging system 202 current. The one or more controllers may be one of several components in a wireless power transfer system, such as the wireless power transfer system 100 of FIG. 1. The components of an example wireless power transfer system are illustrated below with respect to FIG. 5.

Figure 5:
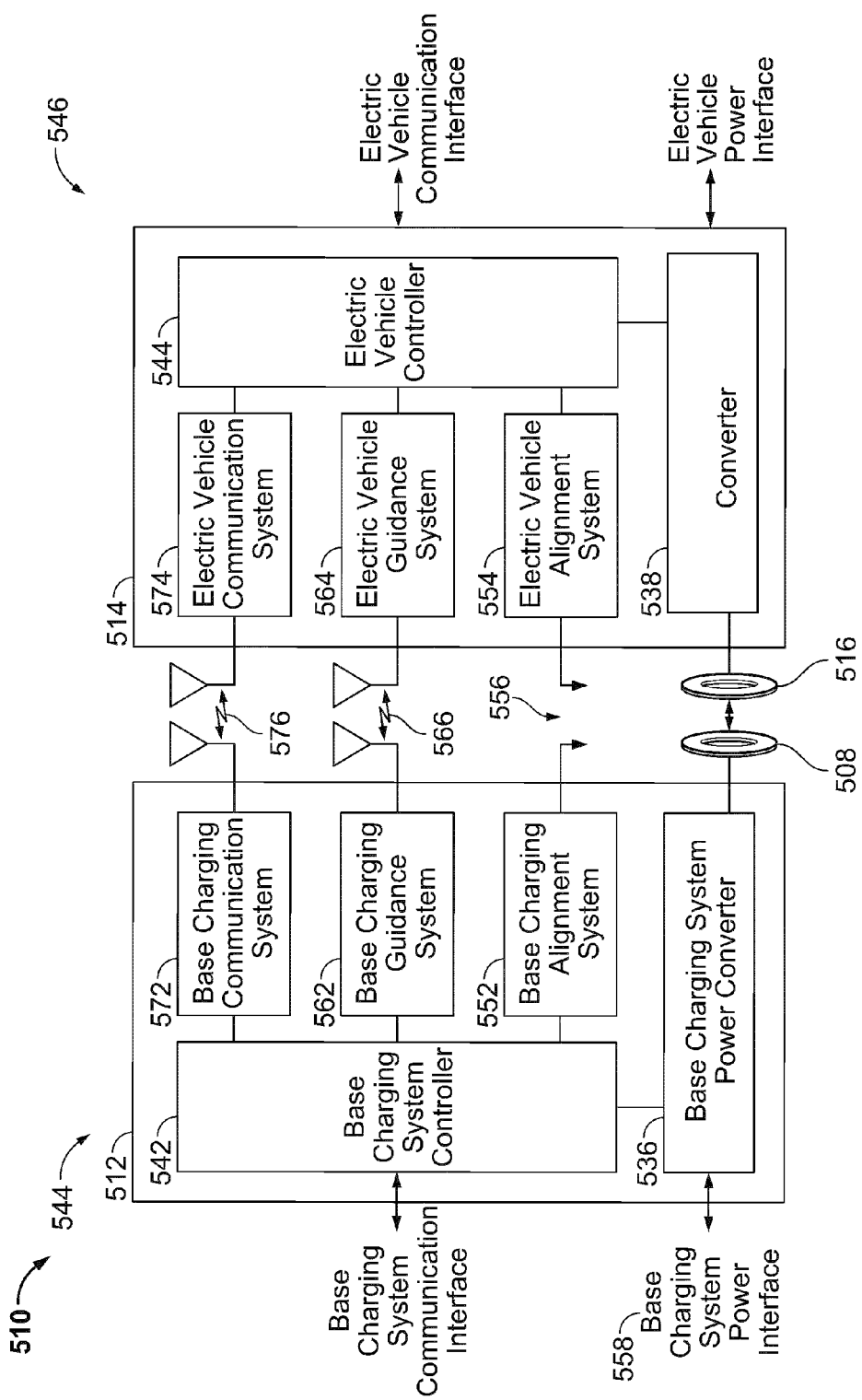
FIG. 5 is a functional block diagram showing exemplary core and ancillary components of the wireless power transfer system of FIG. 1.

FIG. 5 is a functional block diagram showing exemplary core and ancillary components of the wireless power transfer system 100 of FIG. 1. The wireless power transfer system 510 illustrates a communication link 576, a guidance link 566, and alignment systems 552, 554 for the base system induction coil 508 (e.g., the substantially co-planar transmitter coils 303a and 303b or the single transmitter coil 306) and electric vehicle induction coil 516 (e.g., the receiver coils 304a, 304b, and 305). As described above with reference to FIG. 2, and assuming energy flow towards the electric vehicle 112, in FIGS. 3A-B a base charging system power interface 558 may be configured to provide power to a charging system power converter 536 from a power source, such as an AC or DC power supply. The base charging system power converter 536 may receive AC or DC power from the base charging system power interface 558 to excite the base system induction coil 508 at or near its resonant frequency. The electric vehicle induction coil 516, when in the near field coupling-mode region, may receive energy from the near field coupling mode region to oscillate at or near the resonant frequency. The electric vehicle power converter 538 converts the oscillating signal from the electric vehicle induction coil 516 to a power signal suitable for charging a battery via the electric vehicle power interface. The electric vehicle power converter 538 may also include one or more sensors, such as current sensors or power sensors, configured to detect the current (or power) induced in the electric vehicle induction coil 516. Measurements from the sensors may be transmitted to the electric vehicle controller 544.

The base wireless charging system 512 includes a base charging system controller 542 and the electric vehicle charging system 514 includes an electric vehicle controller 544. The base charging system controller 542 may include a base charging system communication interface to other systems (not shown) such as, for example, a computer, and a power distribution center, or a smart power grid. The electric vehicle controller 544 may include an electric vehicle communication interface to other systems (not shown) such as, for example, an on-board computer on the vehicle, other battery charging controller, other electronic systems within the vehicles, and remote electronic systems. The electric vehicle controller 544 may control which receiver coils supply current to the battery and/or the amount of current supplied to the battery. The functionality of the electric vehicle controller 544 is described in greater detail below.

The base charging system controller 542 and electric vehicle controller 544 may include subsystems or modules for specific application with separate communication channels. These communications channels may be separate physical channels or separate logical channels. As non-limiting examples, a base charging alignment system 552 may communicate with an electric vehicle alignment system 554 through a communication link 576 to provide a feedback mechanism for more closely aligning the base system induction coil 508 and electric vehicle induction coil 516, either autonomously or with operator assistance. Similarly, a base charging guidance system 562 may communicate with an electric vehicle guidance system 564 through a guidance link to provide a feedback mechanism to guide an operator in aligning the base system induction coil 508 and electric vehicle induction coil 516. In addition, there may be separate general-purpose communication links (e.g., channels) supported by base charging communication system 572 and electric vehicle communication system 574 for communicating other information between the base wireless power charging system 512 and the electric vehicle charging system 514. This information may include information about electric vehicle characteristics, battery characteristics, charging status, and power capabilities of both the base wireless power charging system 512 and the electric vehicle charging system 514, as well as maintenance and diagnostic data for the electric vehicle 112. These communication channels may be separate physical communication channels such as, for example, Bluetooth, zigbee, cellular, etc. These systems may operate to determine and communicate the relative positions and/or the relative orientations of the base system induction coil 508 and electric vehicle induction coil 516 in any appropriate manner.

To communicate between a base wireless charging system 512 and an electric vehicle charging system 514, the wireless power transfer system 510 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 508 and 516 may also be configured to act as wireless communication transmitters. Thus, some embodiments of the base wireless power charging system 512 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 536 may include a load sensing circuit (not shown) for detecting the presence or absence of active electric vehicle receivers in the vicinity of the near field generated by the base system induction coil 508. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 542 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

In an embodiment, the electric vehicle controller 544 determines which receiver coils should supply current to the battery based on a comparison of parameters. The parameters may include the current (or power) induced in the co-planar receiver coils 304a and 304b, the current (or power) induced in the third receiver coil 305, and the duty cycle of the base wireless power charging system 202. Current values and power values may be used interchangeably in describing the operations performed by the electric vehicle controller 544 in determining which receiver coils should supply current to the battery. For the purposes of clarity, the operations performed by the electric vehicle controller 544 are described herein based on measured current values.

A current of the base wireless power charging system 202 may be a function of the duty cycle (e.g., the current of the base wireless power charging system 202 and the duty cycle may be linearly proportional). For example, as the duty cycle is increased, the current of the base wireless power charging system 202 may increase. Consequently, the current induced in one or more of the receiver coils 304a, 304b, and/or 305 may be increased. However, in some embodiments, such properties may not hold as the duty cycle reaches a certain threshold (e.g., 80%). For example, once the certain threshold is reached, the current induced in one or more of the receiver coils 304a, 305b, and/or 305 may not increase at a proportional rate even as the duty cycle is increased. The duty cycle may be increased if not enough current is induced in the receiver coils. Likewise, the duty cycle may be decreased if too much current is induced in the receiver coils.

In an embodiment, the duty cycle is determined by the base wireless power charging system 202. For example, the base wireless power charging system 202 may determine the duty cycle based on the current generated into the transmitter coils 303a and 303b and/or 306. The duty cycle may then be transmitted to the electric vehicle 112 via a communication channel, such as the communication link 576 described below with respect to FIG. 5. In another embodiment, the duty cycle is determined by the electric vehicle 112, such as the converter 538 or the electric vehicle controller 544. The duty cycle may then be transmitted to the base wireless power charging system 202 via the communication channel, such as the communication link 576.

In some embodiments, a comparison of the current induced in the co-planar receiver coils 304a and 304b with the current induced in the third receiver coil 305 may indicate which receiver coil is currently generating a larger amount of current. A comparison of the current induced in the co-planar receiver coils 304a and 304b with the duty cycle (e.g., a ratio of the current induced in the co-planar receiver coils 304a and 304b over the duty cycle) may indicate an amount of current that can be supplied by the co-planar receiver coils 304a and 304b to the battery. Likewise, a comparison of the current induced in the third receiver coil 305 with the duty cycle (e.g., a ratio of the current induced in the third receiver coil 305 over the duty cycle) may indicate an amount of current that can be supplied by the third receiver coil 305 to the battery.

Generally, the electric vehicle controller 544 may initially enable the co-planar receiver coils 304a and 304b or the third receiver coil 305 depending on which is the dominant coil or which has a higher initial induced current. For example, the dominant coil may be the coil(s) that has a higher induced current when the transmitter coils and receiver coils are perfectly aligned. After the initial receiver coil(s) is enabled, the electric vehicle controller 544 may perform additional analyses to enable and/or disable receiver coils. As described herein, the co-planar receiver coils 304a and 304b are considered the dominant coils and/or the receiver coils with a higher initial induced current. The analyses performed by the electric vehicle controller 544 as described below is taken from the perspective that the co-planar receiver coils 304a and 304b are the dominant coils and/or the receiver coils with a higher initial induced current. However, the third receiver coil 305 may be the dominant coil and/or the receiver coil with a higher initial induced current, and the third receiver coil 305 and the co-planar receiver coils 304a and 304b may be interchanged in the analyses below.

Charging may occur statically or dynamically. Static charging occurs when the electric vehicle 112 is stationary. Dynamic charging occurs when the electric vehicle 112 is moving. During dynamic charging, the dominant coil may be determined and enabled by the electric vehicle controller 544.

In an embodiment, the electric vehicle controller 544 is configured to enable the co-planar receiver coils 304a and 304b to supply current to the battery in one of several situations. In a first embodiment, the electric vehicle controller 544 determines whether the ratio of the current induced in the co-planar receiver coils 304a and 304b over the duty cycle exceeds a first threshold value. For example, a desired current may be 10 A and a typical duty cycle may be between 50% and 80%. Thus, a first threshold value may be 0.125. Exceeding the first threshold value may indicate that enough current is induced to charge the battery. If the ratio exceeds the first threshold value, the electric vehicle controller 544 determines whether the current of the co-planar receiver coils 304a and 304b is greater than the current of the third receiver coil 305. If the current of the co-planar receiver coils 304a and 304b is greater than the current of the third receiver coil 305, then the electric vehicle controller 544 enables the co-planar receiver coils 304a and 304b and/or disables the third receiver coil 305.

In a second embodiment, the electric vehicle controller 544 determines whether the ratio of the current induced in the co-planar receiver coils 304a and 304b over the duty cycle exceeds the first threshold value. If the ratio does not exceed the first threshold value, the electric vehicle controller 544 determines whether the current of the third receiver coil 305 is greater than the current of the co-planar receiver coils 304a and 304b. If the current of the third receiver coil 305 is less than the current of the co-planar receiver coils 304a and 304b, then the electric vehicle controller 544 enables the co-planar receiver coils 304a and 304b.

In a third embodiment, the electric vehicle controller 544 determines whether the ratio of the current induced in the co-planar receiver coils 304a and 304b over the duty cycle exceeds a first threshold value. If the ratio does not exceed the first threshold value, the electric vehicle controller 544 determines whether the current of the third receiver coil 305 is greater than the current of the co-planar receiver coils 304a and 304b. If the current of the third receiver coil 305 is greater than the current of the co-planar receiver coils 304a and 304b, the electric vehicle controller 544 determines whether the ratio of the current induced in the third receiver coil 305 over the duty cycle exceeds the first threshold value. If the ratio does not exceed the first threshold value, then the electric vehicle controller 544 enables the co-planar receiver coils 304a and 304b.

In a fourth embodiment, the electric vehicle controller 544 determines the transmitter coil arrangement and an alignment of the transmitter coils 303a, 303b, and/or 306 and the receiver coils 304a, 304b, and 305. For example, the electric vehicle controller 544 may receive the transmitter coil arrangement information via the communication link 576 and/or the guidance link 566. Furthermore, the electric vehicle controller 544 may receive the alignment information from the electric vehicle alignment system 554. In some embodiments, if the alignment is within the operational band (e.g., within box 408 of FIGS. 4A and 4C), the electric vehicle controller 544 enables the co-planar receiver coils 304a and 304b regardless of the transmitter coil arrangement. In other embodiments, if the alignment is within the operational band, the electric vehicle controller 544 enables the co-planar receiver coils 304a and 304b only if the transmitter coil is arranged in a double base configuration. For example, in the rectangular base configuration, the current induced in the third receiver coil 305 may be sufficient to charge the battery and/or the current induced in the co-planar receiver coils 304a and 304b may be insufficient to charge the battery.

In an embodiment, the electric vehicle controller 544 is configured to enable the third receiver coil 305 to supply current to the battery in one of several situations. In a first embodiment, the electric vehicle controller 544 determines whether the ratio of the current induced in the co-planar receiver coils 304a and 304b over the duty cycle exceeds the first threshold value. If the ratio exceeds the first threshold value, the electric vehicle controller 544 determines whether the current of the co-planar receiver coils 304a and 304b is greater than the current of the third receiver coil 305. If the current of the co-planar receiver coils 304a and 304b is less than the current of the third receiver coil 305, then the electric vehicle controller 544 enables the third receiver coil 305 and/or disables the co-planar receiver coils 304a and 304b.

In a second embodiment, the electric vehicle controller 544 determines whether the ratio of the current induced in the co-planar receiver coils 304a and 304b over the duty cycle exceeds the first threshold value. If the ratio does not exceed the first threshold value, the electric vehicle controller 544 enables the third receiver coil 305 and/or disables the co-planar receiver coils 304a and 304b.

In a third embodiment, the electric vehicle controller 544 determines the transmitter coil arrangement and an alignment of the transmitter coils 303a, 303b, and/or 306 and the receiver coils 304a, 304b, and 305. For example, as described above, the electric vehicle controller 544 may receive the transmitter coil arrangement information via the communication link 576 and/or the guidance link 566. Furthermore, the electric vehicle controller 544 may receive the alignment information from the electric vehicle alignment system 554. In some embodiments, if the alignment is within the operational band (e.g., within box 408 of FIGS. 4A and 4C) and the transmitter coil is arranged in a rectangular base configuration, the electric vehicle controller 544 enables the third receiver coil 305 and/or the co-planar receiver coils 304a and 304b. For example, the current induced in the third receiver coil 305 may be sufficient to charge the battery and/or the current induced in the co-planar receiver coils 304a and 304b may be insufficient to charge the battery.

In an embodiment, the electric vehicle controller 544 is configured to enable both the co-planar receiver coils 304a and 304b and the third receiver coil 305 to supply current to the battery in one of several situations. In a first embodiment, the electric vehicle controller 544 determines whether the ratio of the current induced in the co-planar receiver coils 304a and 304b over the duty cycle exceeds the first threshold value. If the ratio does not exceed the first threshold value, the electric vehicle controller 544 determines whether the current of the third receiver coil 305 is greater than the current of the co-planar receiver coils 304a and 304b. If the current of the third receiver coil 305 is not greater than the current of the co-planar receiver coils 304a and 304b, then the electric vehicle controller 544 enables both the co-planar receiver coils 304a and 304b and the third receiver coil 305.

In a second embodiment, the electric vehicle controller 544 determines whether the ratio of the current induced in the co-planar receiver coils 304a and 304b over the duty cycle exceeds the first threshold value. If the ratio does not exceed the first threshold value, the electric vehicle controller 544 determines whether the current of the third receiver coil 305 is greater than the current of the co-planar receiver coils 304a and 304b. If the current of the third receiver coil 305 is greater than the current of the co-planar receiver coils 304a and 304b, the electric vehicle controller 544 determines whether the ratio of the current induced in the third receiver coil 305 over the duty cycle exceeds the first threshold value. If the ratio does not exceed the first threshold value, then the electric vehicle controller 544 enables both the co-planar receiver coils 304a and 304b and the third receiver coil 305.

As described above, the transmitter coil arrangement may affect which receiver coil(s) the electric vehicle controller 544 enables. For example, if the transmitter coils are arranged in a double base configuration, the electric vehicle controller 544 may leave the co-planar receiver coils 304a and 304b enabled and enable or disable the third receiver coil 305 based on the alignment (e.g., whether the alignment falls within the operational band). If the transmitter coil is arranged in a rectangular base configuration, the electric vehicle controller 544 may enable the co-planar receiver coils 304a and 304b and/or the third receiver coil 305 based on the alignment.

In further embodiments, the electric vehicle controller 544 or a second controller, not shown, limits the amount of current supplied to the battery. For example, the co-planar receiver coils 304a and 304b, the third receiver coil 305, or both, may be supplying current to the battery. If the current is too high, the electric vehicle controller 544 or the second controller may limit the current flow from any of the receiver coils 304a, 304b, and/or 305. As an example, the electric vehicle controller 544 or the second controller may control a synchronous rectifier that shorts one or more of the receiver coils 304a, 304b, and/or 305 to limit the current flow to the battery.

Figure 6:
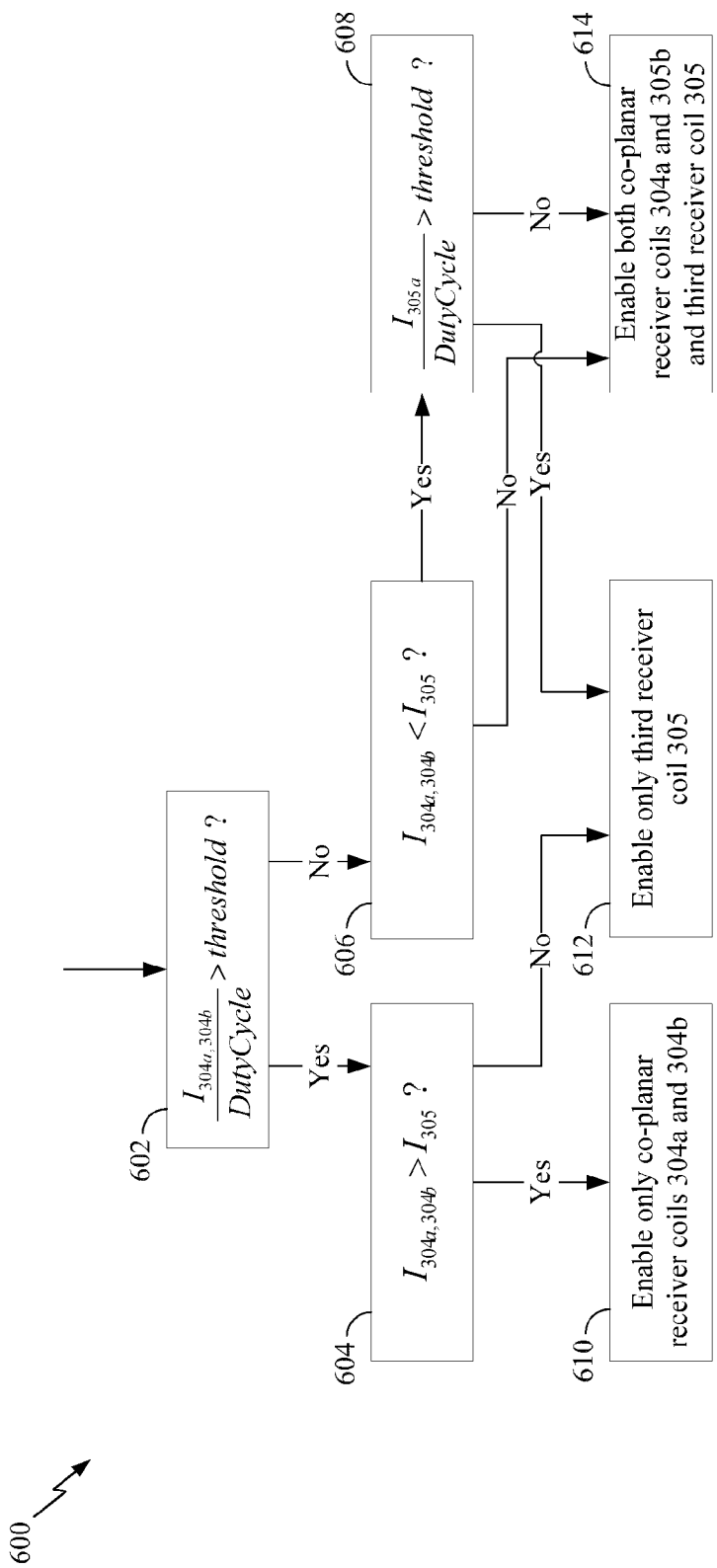
FIG. 6 is a flowchart illustrating operations that may be performed by an electric vehicle controller.

FIG. 6 illustrates a flowchart 600 of operations that may be performed by an electric vehicle controller, such as the electric vehicle controller 544 of FIG. 5. As described above, the electric vehicle controller 544 may perform additional analyses to enable and/or disable receiver coils. In an embodiment, the electric vehicle controller 544 may begin at block 602.

At block 602, the electric vehicle controller 544 determines whether a ratio of the current induced in the co-planar receiver coils 304a and 304b over the duty cycle is greater than a threshold value (e.g., the first threshold value described above). If the ratio is greater than the threshold, the electric vehicle controller 544 proceeds to block 604. Otherwise, the electric vehicle controller 544 proceeds to block 606.

At block 604, the electric vehicle controller 544 determines whether the current induced in the co-planar receiver coils 304a and 304b is greater than the current induced in the third receiver coil 305. If the current induced in the co-planar receiver coils 304a and 304b is greater, the electric vehicle controller 544 enables only the co-planar receiver coils 304a and 304b, as illustrated in block 610. Otherwise, the electric vehicle controller 544 enables only the third receiver coil 305, as illustrated in block 612.

At block 606, the electric vehicle controller 544 determines whether the current induced in the co-planar receiver coils 304a and 304b is less than the current induced in the third receiver coil 305. If the current induced in the co-planar receiver coils 304a and 304b is less, the electric vehicle controller 544 proceeds to block 608. Otherwise, the electric vehicle controller 544 enables both the co-planar receiver coils 304a and 304b and the third receiver coil 305, as illustrated in block 614.

At block 608, the electric vehicle controller 544 determines whether a ratio of the current induced in the third receiver coil 305 over the duty cycle is greater than the threshold value. If the ratio is greater than the threshold value, the electric vehicle controller 544 enables only the third receiver coil 305, as illustrated in block 612. Otherwise, the electric vehicle controller 544 enables both the co-planar receiver coils 304a and 304b and the third receiver coil 305, as illustrated in block 614.

Figure 7:
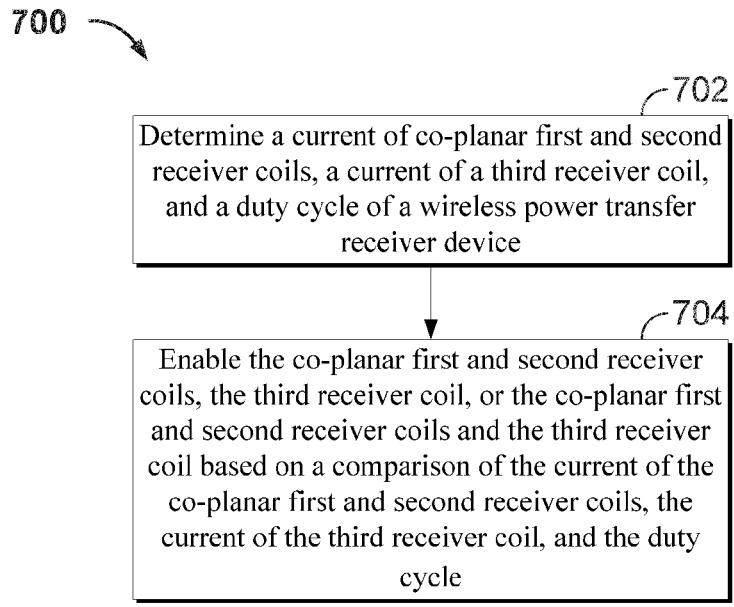
FIG. 7 is a flowchart of an exemplary method for controlling a current supplied to a battery.

FIG. 7 is a flowchart of an exemplary method 700 for controlling a current supplied to a battery. In an embodiment, the steps in flowchart 700 may be performed by electric vehicle controller 544. Although the method of flowchart 700 is described herein with reference to a particular order, in various embodiments, blocks herein may be performed in a different order, or omitted, and additional blocks may be added. A person having ordinary skill in the art will appreciate that the method of flowchart 700 may be implemented in a device that may be configured to charge another device via the wireless transfer of power.

At block 702, the method 700 determines a current of co-planar first and second receiver coils, a current of a third receiver coil, and a duty cycle of a wireless power transfer receiver device. In an embodiment, the co-planar first and second receiver coils are collectively positioned substantially central to the third receiver coil. At block 704, the method 700 enables the co-planar first and second receiver coils, the third receiver coil, or the co-planar first and second receiver coils and the third receiver coil based on a comparison of the current of the co-planar first and second receiver coils, the current of the third receiver coil, and the duty cycle.

Figure 8:
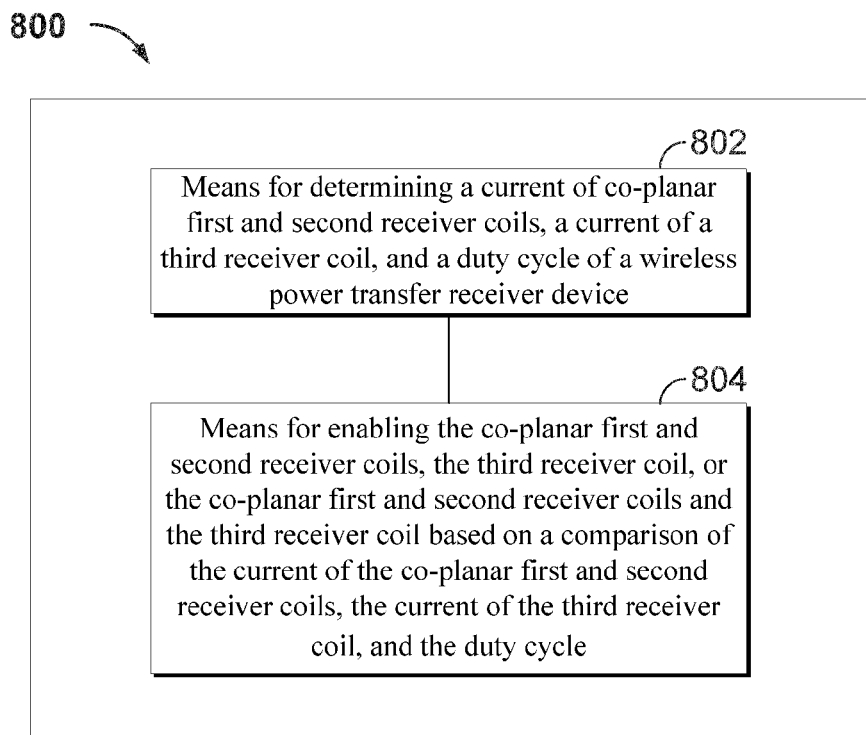
FIG. 8 is a functional block diagram of an electric vehicle, in accordance with an exemplary embodiment.

FIG. 8 is a functional block diagram of an electric vehicle 800, in accordance with an exemplary embodiment. Electric vehicle 800 comprises means 802 and means 804 for the various actions discussed with respect to FIGS. 1-6. The electric vehicle 800 includes means 802 for determining a current of co-planar first and second receiver coils, a current of a third receiver coil, and a duty cycle of a wireless power transfer receiver device. In an embodiment, means 802 for determining a current of co-planar first and second receiver coils, a current of a third receiver coil, and a duty cycle of a wireless power transfer receiver device may be configured to perform one or more of the functions discussed above with respect to block 702. The electric vehicle 800 further includes means 804 for enabling the co-planar first and second receiver coils, the third receiver coil, or the co-planar first and second receiver coils and the third receiver coil based on a comparison of the current of the co-planar first and second receiver coils, the current of the third receiver coil, and the duty cycle. In an embodiment, means 804 for enabling the co-planar first and second receiver coils, the third receiver coil, or the co-planar first and second receiver coils and the third receiver coil based on a comparison of the current of the co-planar first and second receiver coils, the current of the third receiver coil, and the duty cycle may be configured to perform one or more of the functions discussed above with respect to block 704.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. The means for determining comprises a sensor (e.g., a current sensor). The means for enabling comprises an electric vehicle controller.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transfer receiver device for controlling a current supplied to a battery, comprising:
    a first receiver coil;
    a second receiver coil, the first and second receiver coils substantially co-planar;
    a third receiver coil, the co-planar first and second receiver coils collectively positioned substantially central to the third receiver coil, the first, second, and third receiver coils configured to electrically connect to a load; and
    a controller comprising a sensor, the controller configured to determine a current of the co-planar first and second receiver coils, a current of the third receiver coil, and a duty cycle of a power signal received by the wireless power transfer receiver device using the sensor, the controller further configured to enable:
        the co-planar first and second receiver coils to supply first current to the load,
        the third receiver coil to supply second current to the load, or
        the co-planar first and second receiver coils to supply the first current to the load and the third receiver coil to supply the second current to the load based on at least one of a comparison of the current of the co-planar first and second receiver coils with the current of the third receiver coil or a comparison of the current of the co-planar first and second receiver coils with the duty cycle,
    wherein the first receiver coil, the second receiver coil, and the third receiver coil are implemented in the wireless power transfer receiver for wireless power transfer.

2. The device of claim 1, wherein the controller is configured to enable the co-planar first and second receiver coils if a ratio of the current of the co-planar first and second receiver coils over the duty cycle is greater than a first threshold value and if the current of the third receiver coil is less than the current of the co-planar first and second receiver coils.

3. The device of claim 1, wherein the controller is configured to enable the third receiver coil if a ratio of the current of the co-planar first and second receiver coils over the duty cycle is greater than a first threshold value and if the current of the third receiver coil is greater than the current of the co-planar first and second receiver coils.

4. The device of claim 1, wherein the controller is configured to enable the third receiver coil if a ratio of the current of the co-planar first and second receiver coils over the duty cycle is less than a first threshold value, if the current of the third receiver coil is greater than the current of the co-planar first and second receiver coils, and if a ratio of the current of the third receiver coil over the duty cycle is greater than the first threshold value.

5. The device of claim 1, wherein the controller is configured to enable the co-planar first and second receiver coils and the third receiver coil if a ratio of the current of the co-planar first and second receiver coils over the duty cycle is less than a first threshold value and if the current of the third receiver coil is less than the current of the co-planar first and second receiver coils.

6. The device of claim 1, wherein the controller is configured to enable the co-planar first and second receiver coils and the third receiver coil if a ratio of the current of the co-planar first and second receiver coils over the duty cycle is less than a first threshold value, if the current of the third receiver coil is greater than the current of the co-planar first and second receiver coils, and if a ratio of the current of the third receiver coil over the duty cycle is less than the first threshold value.

7. The device of claim 1, wherein a wireless power transfer transmitter configured to transmit power wirelessly to the wireless power transfer receiver device comprises a transmitter coil arranged in a rectangular base configuration, and wherein the transmitter coil is aligned with the co-planar first and second receiver coils and the third receiver coil within an operational band.

8. The device of claim 7, wherein the controller is configured to enable one of the co-planar first and second receiver coils or the third receiver coil.

9. The device of claim 1, wherein a wireless power transfer transmitter configured to transmit power wirelessly to the wireless power transfer receiver device comprises first and second transmitter coils arranged in a double base configuration, and wherein the first and second transmitter coils are aligned with the co-planar first and second receiver coils and the third receiver coil within an operational band.

10. The device of claim 9, wherein the controller is configured to enable the co-planar first and second receiver coils.

11. The device of claim 10, wherein the controller is configured to enable the third receiver coil if a ratio of the current of the co-planar first and second receiver coils over the duty cycle is less than a first threshold value and if the current of the third receiver coil is less than the current of the co-planar first and second receiver coils.

12. The device of claim 9, wherein the wireless power transfer transmitter is further configured to determine the duty cycle and transmit the duty cycle to the wireless power transfer receiver device.

13. The device of claim 1, further comprising a second controller configured to limit an amount of current generated by at least one of the co-planar first and second receiver coils or the third receiver coil.

14. A method for controlling a current supplied to a battery, the method comprising:
determining a current of co-planar first and second receiver coils, a current of a third receiver coil, and a duty cycle of a power signal received by a wireless power transfer receiver device using a sensor, the co-planar first and second receiver coils collectively positioned substantially central to the third receiver coil; and
enabling the co-planar first and second receiver coils to supply first current to a load, the third receiver coil to supply second current to the load, or the co-planar first and second receiver coils to supply the first current to the load and the third receiver coil to supply the second current to the load based on at least one of a comparison of the current of the co-planar first and second receiver coils with the current of the third receiver coil or a comparison of the current of the co-planar first and second receiver coils with the duty cycle,
wherein the first receiver coil, the second receiver coil, and the third receiver coil are implemented in a device that is used for wireless power transfer.

15. The method of claim 14, further comprising enabling the co-planar first and second receiver coils if a ratio of the current of the co-planar first and second receiver coils over the duty cycle is greater than a first threshold value and if the current of the third receiver coil is less than the current of the co-planar first and second receiver coils.

16. The method of claim 14, further comprising enabling the third receiver coil if a ratio of the current of the co-planar first and second receiver coils over the duty cycle is greater than a first threshold value and if the current of the third receiver coil is greater than the current of the co-planar first and second receiver coils.

17. The method of claim 14, further comprising enabling the third receiver coil if a ratio of the current of the co-planar first and second receiver coils over the duty cycle is less than a first threshold value, if the current of the third receiver coil is greater than the current of the co-planar first and second receiver coils, and if a ratio of the current of the third receiver coil over the duty cycle is greater than the first threshold value.

18. The method of claim 14, further comprising enabling the co-planar first and second receiver coils and the third receiver coil if a ratio of the current of the co-planar first and second receiver coils over the duty cycle is less than a first threshold value and if the current of the third receiver coil is less than the current of the co-planar first and second receiver coils.

19. The method of claim 14, further comprising enabling the co-planar first and second receiver coils and the third receiver coil if a ratio of the current of the co-planar first and second receiver coils over the duty cycle is less than a first threshold value, if the current of the third receiver coil is greater than the current of the co-planar first and second receiver coils, and if a ratio of the current of the third receiver coil over the duty cycle is less than the first threshold value.

20. The method of claim 14, further comprising receiving power wirelessly transmitted by a wireless power transfer transmitter, the wireless power transfer transmitter comprising a transmitter coil arranged in a rectangular base configuration, wherein the transmitter coil is aligned with the co-planar first and second receiver coils and the third receiver coil within an operational band.

21. The method of claim 20, further comprising enabling one of the co-planar first and second receiver coils or the third receiver coil.

22. The method of claim 14, further comprising receiving power wirelessly transmitted by a wireless power transfer transmitter, the wireless power transfer transmitter comprising first and second transmitter coils arranged in a double base configuration, and wherein the first and second transmitter coils are aligned with the co-planar first and second receiver coils and the third receiver coil within an operational band.

23. The method of claim 22, further comprising enabling the co-planar first and second receiver coils.

24. The method of claim 23, further comprising enabling the third receiver coil if a ratio of the current of the co-planar first and second receiver coils over the duty cycle is less than a first threshold value and if the current of the third receiver coil is less than the current of the co-planar first and second receiver coils.

25. The method of claim 22, further comprising receiving the duty cycle from the wireless power transfer transmitter, wherein the wireless power transfer transmitter is configured to determine the duty cycle.

26. The method of claim 14, further comprising limiting an amount of current generated by at least one of the co-planar first and second receiver coils or the third receiver coil.

27. An apparatus for controlling a current supplied to a battery, the apparatus comprising:
means for determining a current of co-planar first and second receiver coils, a current of a third receiver coil, and a duty cycle of a power signal received by a wireless power transfer receiver device, the co-planar first and second receiver coils collectively positioned substantially central to the third receiver coil; and
means for enabling the co-planar first and second receiver coils to supply first current to a load, the third receiver coil to supply second current to the load, or the co-planar first and second receiver coils to supply the first current to the load and the third receiver coil to supply the second current to the load based on at least one of a comparison of the current of the co-planar first and second receiver coils with the current of the third receiver coil or a comparison of the current of the co-planar first and second receiver coils with the duty cycle,
wherein the first receiver coil, the second receiver coil, and the third receiver coil are implemented in the apparatus for wireless power transfer.

28. The apparatus of claim 27, further comprising means for enabling the co-planar first and second receiver coils if a ratio of the current of the co-planar first and second receiver coils over the duty cycle is greater than a first threshold value and if the current of the third receiver coil is less than the current of the co-planar first and second receiver coils.

29. The apparatus of claim 27, further comprising means for enabling the third receiver coil if a ratio of the current of the co-planar first and second receiver coils over the duty cycle is greater than a first threshold value and if the current of the third receiver coil is greater than the current of the co-planar first and second receiver coils.

30. The apparatus of claim 27, further comprising means for enabling the third receiver coil if a ratio of the current of the co-planar first and second receiver coils over the duty cycle is less than a first threshold value, if the current of the third receiver coil is greater than the current of the co-planar first and second receiver coils, and if a ratio of the current of the third receiver coil over the duty cycle is greater than the first threshold value.

31. The apparatus of claim 27, further comprising means for enabling the co-planar first and second receiver coils and the third receiver coil if a ratio of the current of the co-planar first and second receiver coils over the duty cycle is less than a first threshold value and if the current of the third receiver coil is less than the current of the co-planar first and second receiver coils.

32. The apparatus of claim 27, further comprising means for enabling the co-planar first and second receiver coils and the third receiver coil if a ratio of the current of the co-planar first and second receiver coils over the duty cycle is less than a first threshold value, if the current of the third receiver coil is greater than the current of the co-planar first and second receiver coils, and if a ratio of the current of the third receiver coil over the duty cycle is less than the first threshold value.

33. The apparatus of claim 27, further comprising means for limiting an amount of current generated by at least one of the co-planar first and second receiver coils or the third receiver coil.

34. The apparatus of claim 27, wherein the means for determining comprises a current sensor, and wherein the means for enabling comprises an electric vehicle controller.

35. A non-transitory computer-readable medium comprising code that, when executed, causes an apparatus to:
  determine a current of co-planar first and second receiver coils, a current of a third receiver coil, and a duty cycle of a power signal received by a wireless power transfer receiver device using a sensor, the co-planar first and second receiver coils collectively positioned substantially central to the third receiver coil; and
  enable the co-planar first and second receiver coils to supply first current to a load, the third receiver coil to supply second current to the load, or the co-planar first and second receiver coils to supply the first current to the load and the third receiver coil to supply the second current to the load based on at least one of a comparison of the current of the co-planar first and second receiver coils with the current of the third receiver coil or a comparison of the current of the co-planar first and second receiver coils with the duty cycle,
  wherein the first receiver coil, the second receiver coil, and the third receiver coil are implemented in the apparatus for wireless power transfer.

36. The medium of claim 35, further comprising code that, when executed, causes an apparatus to enable the co-planar first and second receiver coils if a ratio of the current of the co-planar first and second receiver coils over the duty cycle is greater than a first threshold value and if the current of the third receiver coil is less than the current of the co-planar first and second receiver coils.

37. The medium of claim 35, further comprising code that, when executed, causes an apparatus to enable the third receiver coil if a ratio of the current of the co-planar first and second receiver coils over the duty cycle is greater than a first threshold value and if the current of the third receiver coil is greater than the current of the co-planar first and second receiver coils.

38. The medium of claim 35, further comprising code that, when executed, causes an apparatus to enable the third receiver coil if a ratio of the current of the co-planar first and second receiver coils over the duty cycle is less than a first threshold value, if the current of the third receiver coil is greater than the current of the co-planar first and second receiver coils, and if a ratio of the current of the third receiver coil over the duty cycle is greater than the first threshold value.

39. The medium of claim 35, further comprising code that, when executed, causes an apparatus to enable the co-planar first and second receiver coils and the third receiver coil if a ratio of the current of the co-planar first and second receiver coils over the duty cycle is less than a first threshold value and if the current of the third receiver coil is less than the current of the co-planar first and second receiver coils.

40. The medium of claim 35, further comprising code that, when executed, causes an apparatus to enable the co-planar first and second receiver coils and the third receiver coil if a ratio of the current of the co-planar first and second receiver coils over the duty cycle is less than a first threshold value, if the current of the third receiver coil is greater than the current of the co-planar first and second receiver coils, and if a ratio of the current of the third receiver coil over the duty cycle is less than the first threshold value.

41. The medium of claim 35, further comprising code that, when executed, causes an apparatus to limit an amount of current generated by at least one of the co-planar first and second receiver coils or the third receiver coil.

\* \* \* \* \*